United States Patent [19]

Cargile

[11] Patent Number: 4,599,489
[45] Date of Patent: Jul. 8, 1986

[54] SOLID STATE KEY FOR CONTROLLING ACCESS TO COMPUTER SOFTWARE

[75] Inventor: William P. Cargile, Half Moon Bay, Calif.

[73] Assignee: Gordian Systems, Inc., Palo Alto, Calif.

[21] Appl. No.: 582,302

[22] Filed: Feb. 22, 1984

[51] Int. Cl.$^4$ ............................................. G06K 5/00
[52] U.S. Cl. ................................................. 178/22.08
[58] Field of Search ............... 178/22.01, 22.06, 22.08, 178/22.09; 364/200 MS File, 900 MS File, 200, 900; 340/825.5; 235/382.5

[56] References Cited

U.S. PATENT DOCUMENTS

| | | | |
|---|---|---|---|
| 3,457,391 | 7/1969 | Yamamoto | 235/61.6 |
| 3,761,683 | 9/1973 | Rogers | 235/61.7 B |
| 3,786,420 | 1/1974 | Stambler | 340/149 A |
| 3,794,813 | 2/1974 | Spetz | 235/61.7 B |
| 3,806,874 | 4/1974 | Ehrat | 340/149 R |
| 3,891,799 | 6/1975 | Melhose | 178/22 |
| 3,938,091 | 2/1976 | Atalla | 340/149 A |
| 4,198,619 | 4/1980 | Atalla | 340/149 A |
| 4,268,715 | 5/1981 | Atalla | 178/22 |
| 4,281,215 | 7/1981 | Atalla | 178/22.08 |
| 4,283,599 | 8/1981 | Atalla | 178/22.1 |
| 4,288,659 | 9/1981 | Atalla | 178/22.08 |
| 4,295,039 | 10/1981 | Stuckert | 235/380 |
| 4,304,990 | 12/1981 | Atalla | 235/380 |
| 4,310,720 | 1/1982 | Check, Jr. | 178/22.08 |
| 4,315,101 | 2/1982 | Atalla | 178/22.08 |
| 4,328,414 | 5/1982 | Atalla | 235/380 |
| 4,357,529 | 11/1982 | Atalla | 235/379 |
| 4,447,890 | 5/1984 | Duwel et al. | 364/900 |
| 4,494,114 | 1/1985 | Kaish | 340/825.31 |

FOREIGN PATENT DOCUMENTS 0028965 5/1981 European Pat. Off.
1256730 12/1971 United Kingdom.
2120434 11/1983 United Kingdom.

Primary Examiner—Gareth D. Shaw
Assistant Examiner—John G. Mills
Attorney, Agent, or Firm—Fliesler, Dubb, Meyer & Lovejoy

[57] ABSTRACT

A semiconductor device that functions as a key to control access to a software program resident in a computer. The device includes a continuously running pulse generator that produces an output representative of real time, a shift register permanently storing a unique number and circuitry for executing an algorithm that combines real time and the permanently stored unique number to produce a password. The password is input to the computer. The computer is coded to execute an equivalent algorithm to produce a password within the computer. The two passwords are compared and access to the computer program is afforded only if they bear a prescribed relationship. The computer can be coded to produce on the video display thereof a time-space pattern on the computer video display, circuitry for deriving the stimulus number therefrom, and circuitry for processing the stimulus number so that the password displayed by the key is a function of the value of the stimulus number. The computer executes a similar procedure on the stimulus number so that access to the software program is afforded only if correspondence exists between the user input password and the password generated in the computer.

20 Claims, 6 Drawing Figures

| FLIP-FLOP ID | 100a | 100b | 100c | 100d | } 140 |
| --- | --- | --- | --- | --- | --- |
| OUTPUT STATE(Q) | 0 | 1 | 0 | 1 | |
| FLIP-FLOP ID | 106a | 106b | 106c | 106d | } 142 |
| OUTPUT STATE(Q) (DAY 0) | 1 | 1 | 0 | 0 | |
| FLIP-FLOP ID | 116a | 116b | 116c | 116d | } 144 |
| INITIAL | 0 | 0 | 0 | 0 | |
| STIM NUM = 1 CLOCK 1 | 1 | 1 | 1 | 0 | |
| STIM NUM = 1 CLOCK 2 | 1 | 0 | 0 | 1 | |
| STIM NUM = 1 CLOCK 3 | 0 | 0 | 1  $18_1$ | 0 | } 146 |
| STIM NUM = 0 CLOCK 4 | 0 | 1 | [1 | 1] | |
| INITIAL | 0 | 0 | 0 | 0 | |
| STIM NUM = 0 CLOCK 1 | 0 | 1 | 1 | 0 | |
| STIM NUM = 1 CLOCK 2 | 1 | 1 | 0 | 1 | |
| STIM NUM = 0 CLOCK 3 | 1 | 0 | 0  $18_2$ | 0 | } 148 |
| STIM NUM = 0 CLOCK 4 | 0 | 0 | [1 | 0] | |
| FLIP-FLOP ID | 106a | 106b | 106c | 106d | } 150 |
| OUTPUT STATE(Q) (DAY 1) | 0 | 1 | 1 | 0 | |
| FLIP-FLOP ID | 116a | 116b | 116c | 116d | |
| INITIAL | 0 | 0 | 0 | 0 | |
| STIM NUM = 1 CLOCK 1 | 1 | 0 | 1 | 1 | |
| STIM NUM = 1 CLOCK 2 | 0 | 1 | 1 | 0 | |
| STIM NUM = 1 CLOCK 3 | 1 | 0 | 0  $18_3$ | 0 | } 152 |
| STIM NUM = 1 CLOCK 4 | 1 | 1 | [1 | 1] | |

*FIG. 5*

SOLID STATE KEY FOR CONTROLLING ACCESS TO COMPUTER SOFTWARE

BACKGROUND OF THE INVENTION

1. Field of the Invention

This invention relates to apparatus for affording access to computer software only by authorized persons, and more particularly to apparatus physically independent of the computer equipment but capable of executing an algorithm that can also be executed by the computer equipment to afford access.

2. Description of the Prior Art

Computer software, whether in the form of an operating system program or an application program, is typically stored in media that afford convenient access to a user. Exemplifying such media are main computer memory as well as peripherals such as magnetic disks, magnetic diskettes or magnetic tape. Software on such media requires substantial time and money to develop and it is desired in most cases to limit access to the software to only certain persons.

Numerous techniques for limiting access to computer software are practiced. In multiuser systems it is typical for each user to have an identification code and/or a password which the user must enter before gaining access to the system. Security of the software can be compromised when an authorized user reveals his or her identification code and/or password to unauthorized persons or the access code is discovered by a persistent hacker.

Another technique employed, particularly with respect to application software that is provided on magnetic diskettes, is to encode on the diskette a protective routine that causes the operating system to disable any copying facilities within it. This technique has had only moderate success in preventing unauthorized use or unauthorized copying because programs for disabling such protective routines are widely available.

Although the above described techniques and the copyright laws have impeded unauthorized use and/or copying of computer software, the creators of software continue to experience losses as a result of the activities of unprincipled copiers. This has impeded the creation of software and the allocation of resources necessary to the creation of software.

SUMMARY OF THE INVENTION

The present invention is embodied in a device that is analogous to a key in that it is a small portable device that can be conveniently carried by the user and that can be employed to obtain access to computer software. The key contains solid state or semiconductor electronic elements that can execute a prescribed algorithm to produce a code which the computer receives and affords access to the software if the code is correct.

A semiconductor key embodying the present invention includes a timer which produces a series of pulses at a repetition rate corresponding to the elapse of real time. In the specific embodiments described hereinafter in more detail, the timer produces one pulse per day. The timer pulse changes the contents of a shift register, the output of the shift register being a predetermined function of the calendar date. The device includes a character output display of a password which is a function of the previously mentioned function. When the user inputs the displayed password to a computer program to practice the invention the computer affords access to the software if the password is equal to a number generated within the computer.

In order for the software in the computer to be able to produce an internal password for comparison with the user input password, the user is first prompted by the computer to enter the current date. The computer manipulates the current date by an algorithm corresponding to that in the key to produce the internal password.

An important aspect of the invention is that the shift register within the key is pre-loaded at manufacturing time with a unique number so that the likelihood of two keys being the same unique numbers is insignificant. For example, if the size of the shift register in the key is 32 bits, a size easily achievable under the present state of the art, there are almost five billion bit combinations that can be produced. Because the key is active, i.e., because a continuous supply of power is necessary to maintain the register state, disassembly of the key for the purposes of ascertaining the function is virtually impossible because in disassembly it is highly likely that power to the shift register would be interrupted.

An enhanced version of a software access key embodying the invention, which is even more difficult for unauthorized persons to decode, involves an extra step to produce a password for input by the user. As in the version to which reference has been previously made the key contains a shift register whose state changes with elapsed real time. The computer with which the key is adapted to cooperate is coded to generate a stimulus number which can be randomly generated and which is saved within the host computer. The stimulus number is transmitted to the key without direct connection, one technique for so transmitting the stimulus number involves excitation of one or more predetermined sites on the video display of the host computer and providing in the key two or more photo-sensors which respond to the pattern of excitation of the sites. The key includes circuitry for decoding the pattern of excitation at the display sites and generating a password from a combination of the decoded signal and the output of the above mentioned register that changes with real time. In practicing the invention employing the enhanced version, the association between the password displayed to the user and the current date as manifested by the output of the timer within the key is even more tenuous and therefore more difficult, if not impossible, to display by reverse engineering.

An object of the invention is to provide a hardware device that must be employed to gain access to computer software. This object is achieved by producing and displaying a password which must be input by the user and by so arranging the circuitry in the key that it produces, each time the device is used, a different password in accordance with an algorithm that is virtually impossible to predict.

Another object of the invention is to provide a device of the type described above that is inexpensive, portable and longlasting. The advent of large scale integrated circuit technology, such as manifested in existent wristwatches and the like, permits a key in accordance with the invention to be produced at a moderate cost, particularly when compared to the cost of many software programs.

A feature and advantage of the invention is that is employs digital techniques which afford exponential expansion of the number of possible combinations by merely extending by one or more bits the size of the numbers that the apparatus employs in producing a password.

The foregoing, together with other objects, features and advantages, will be more apparent after referring to the following specification and the accompanying drawings.

BRIEF DESCRIPTION OF THE DRAWINGS

FIG. 5 is a table showing logical states at various points in the circuit of FIG. 4 during a typical operating sequence.

DETAILED DESCRIPTION OF THE PREFERRED EMBODIMENTS

Figure 1:
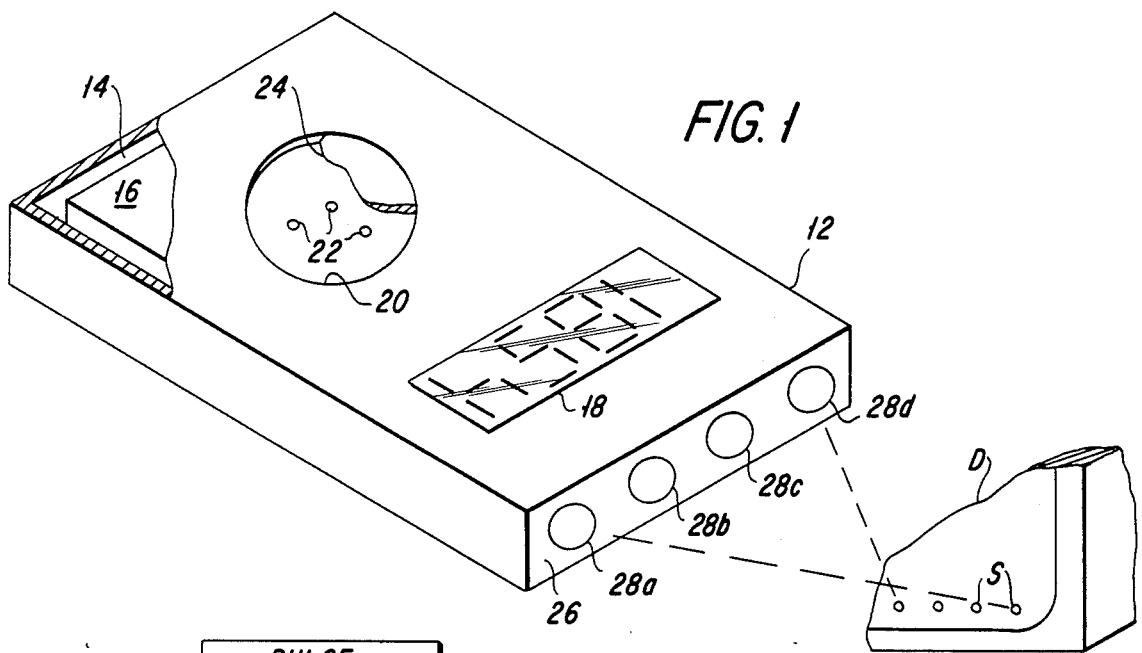
FIG. 1 is a perspective of a computer access key embodying the invention with portions being broken away to reveal internal details.

Referring more particularly to the drawings, reference numeral 12 indicates a key embodying the present invention. The key includes a housing of plastic or like imperforate material which is hollow so as to define a central cavity 14. Within cavity 14 are elements, such as an integrated circuit device indicated fragmentarily at 16. Accessible from the exterior of the imperforate housing is a display 18 formed of conventional numeric or alphanumeric display elements, there being four numeric display elements in the embodiment shown in FIG. 1. Such elements are typically liquid crystal display or LCD elements. In the specific example seen in FIG. 1 display 18 displays the password or a displayed character representation "1854".

The top surface of key 12 is formed with a circular recess 20. The bottom surface of the recess contains one or more contact points 22, or openings in alignment with contact points within cavity 14, for establishing electrical contact with the circuitry 16 within the key. The contact points are employed when the key is set or initialized during manufacture to load a code or bit pattern that is unique to each user. After the key has been so set, a disk shaped cover 24 is installed in recess 20 to insulate contacts 22. Disk shaped cover 24 can be an adhesive backed label having an outer surface containing trademark or product identifying information.

Key 12 has a front face 26. Mounted within face 26 and accessible from the exterior of key are sensors 28a, 28b, 28c and 28d. In the specific embodiment shown in the drawings sensors 28a–28d are photoelectric diodes which respond to images formed on the video display screen D of the computer system containing software to which access is to be had. A fragment of video display screen D is shown at reduced scale in FIG. 1. As will be described subsequently, predetermined sites S on the screen are excited in an appropriate time-space pattern to produce a signal that is received by key 12 by way of sensors 28a–28d. The sensors and the sites on the computer video display exemplify an information transmission link that uses radiant energy and not direct connection between the key and the computer. Other useful forms of radiant energy are sonic energy or radio frequency energy.

Figure 2:
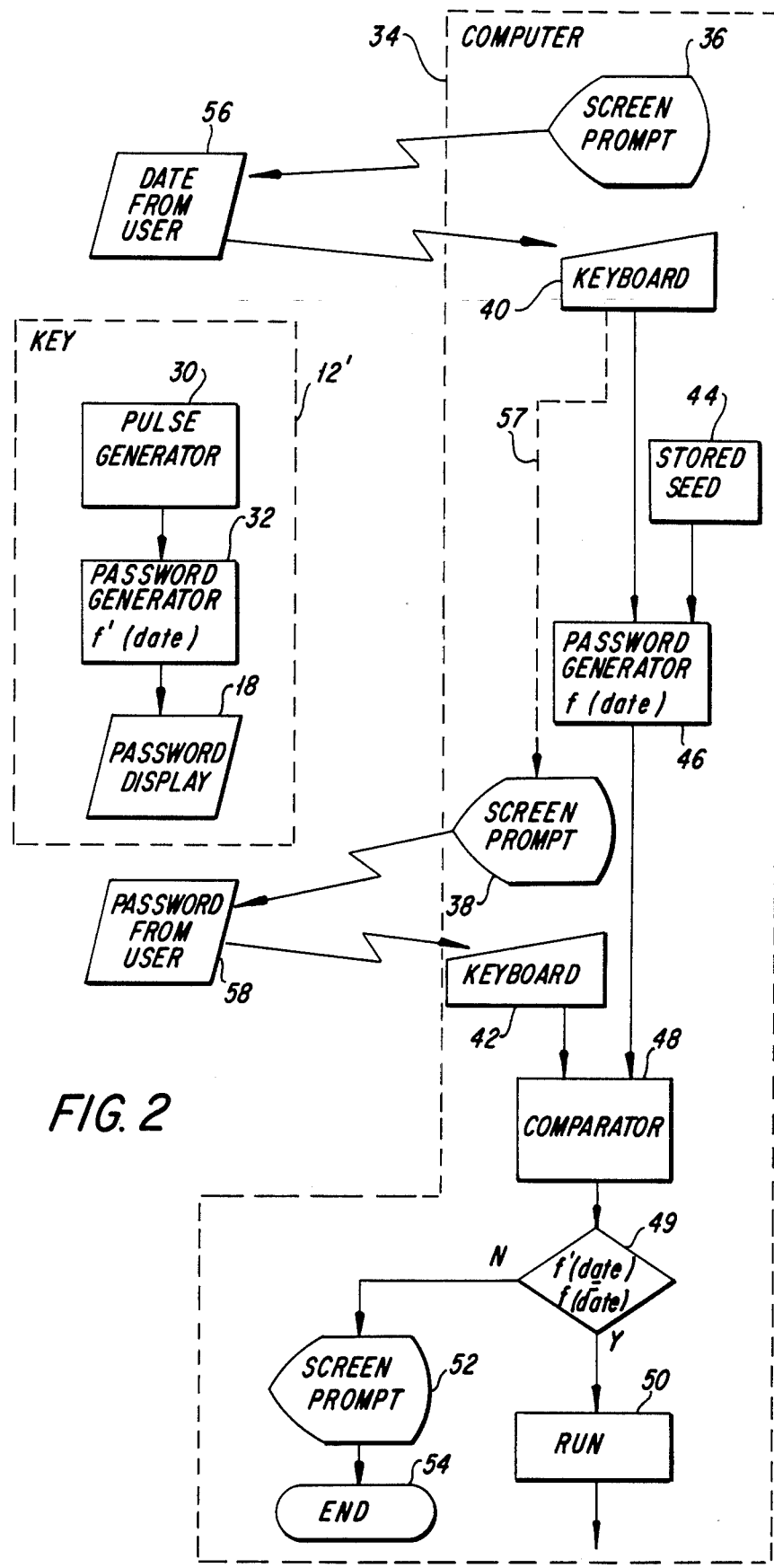
FIG. 2 is a block diagram showing the interaction between a relatively uncomplex key in accordance with the invention and a computer containing code in accordance with the invention.

Referring to FIG. 2, there is a key 12' which is somewhat less complex than that shown in FIG. 1 in that key 12' is not equipped with sensors 28a–28d. Key 12 includes a crystal controlled pulse generator 30 that produces a series of timing pulses that count real time. In one device designed in accordance with the invention, pulse generator 30 produces one pulse per day. The timing pulses supplied by pulse generator 30 are coupled to a password generator 32. The password generator produces a unique combination of binary digits depending on the number of date pulses that have been supplied to it by pulse generator 30 since initialization. Thus the binary bit pattern produced by password generator 32 is a function of the current date, referred to in this description and in FIG. 1 as f' (date).

As will be described in more detail hereinafter in connection with the embodiment of FIGS. 3 and 4, password generator 32 can be embodied in a shift register into which pulses from pulse generator 30 are introduced serially and which produces a bit pattern representing f' (date) at parallel outputs. The specific number of bits produced by the password generator depends more on the number of keys that are to be distributed than circuit capabilities. Because the active components of key 12' are formed of large scale integrated circuits, a virtually unlimited number of bits can be provided in a very small volume.

At least some of the parallel outputs of password generator 32 are connected to a password display 18 which, in one device designed in accordance with the invention, is constituted by a plurality of LCDs. In order to limit the number of digits that a user must input to the computer containing the software to which access is desired, fewer bits are displayed by display 18 than are produced by password generator 32.

It will be seen then that key 12' produces on display 18 a number f' (date) that is a function of the date. In order to render the key immune to reverse engineering or decoding by a persistent hacker, it is preferred that the function f' (date) be such that the relation between the number of date pulses coupled to password generator 32 and the bit pattern output by the password generator not be an inverse relation. In order to facilitate understanding of password generation, the computer and the program resident in it will be described.

Reference numeral 34 indicates a computer containing a software program to which access is sought. The computer can be mainframe, mini or micro and includes a video display screen on which user prompts, indicated at 36 and 38, can be displayed. The computer also includes a keyboard to afford user input, indicated schematically at 40 and 42.

Computer 34 contains a stored seed number schematically represented at 44. The value of the stored seed is representative of the number or state to which password generator 32 in the key has been initialized. The value of the stored seed uniquely associates the key and the software program resident in computer 34. The computer also includes code for executing a password-generating algorithm, indicated diagrammatically at 46, so that the computer can produce, from the combination of the current date input by the user to keyboard 40 and stored seed 44, a password f(date) which corresponds to the password produced in key 12' and displayed on display 18. Also within computer 34 is comparison logic indicated at 48 for comparing the password generated by password generator 46 and the password input by the user to keyboard 42. Decision logic 49 determines subsequent action depending on whether correspondence between f(date) and f' (date) exists. Correspondence between the two passwords causes the protected software to run, indicated schematically at 50; inequality results in a screen prompt or message to the user, indicated at 52, and termination of the attempted access to the program, indicated at 54.

Equality between the functions f(date) and f' (date) is but one example of a predetermined or prescribed relationship between the functions. Another exemplary relationship involves using f(date) as an encryption key and f' (date) as a decryption key.

The operation of the system described to this point requires the user to activate computer 34 so that the video display requests the user via screen prompt 36 to input the current date to the computer. The user's compliance with the screen prompt is schematically indicated at 56, and the date is typed into the computer via keyboard 40. The date supplied to keyboard 40 is coupled to password generator 46 which, as alluded to previously, produces a password that is a function, f(date), of the current date. Such password is applied as one input to comparator 48. Another consequence of a date in proper form being applied to the keyboard is that the computer produces via a control path 57 a second screen prompt, indicated at 38, which instructs the user to input the user's password. The password is produced by key 12' and displayed on display 18. The user's input of the password gleaned from display 18 is indicated schematically at 58, the password being typed into the computer keyboard at 42. The password so typed in by the user is supplied as another input to comparator 48. The comparator 48 supplies a signal to decision logic 49, and if the password f(date) generated within the computer by password generator 46 corresponds to the password f' (date) input at keyboard 42, the software program is caused to run as at 50, that is, the user is afforded access to the software program. If the comparison fails, decision logic 49 causes creation of a screen prompt indicated at 52 informing the user that access to the computer software is denied.

Numerous characteristics of the present invention make it difficult, if not impossible, to decode by reverse engineering or other techniques. The number stored in password generator 32 is stored in a dynamic shift register so that attempted disassembly of the key, which would almost inevitably entail interruption of battery power to the shift register, will destroy the number or state within password generator 32. Because the relation, f' (date), between the date and the password displayed by display 18 is not an inverse function, a person obtaining possession of key 12' cannot derive the function f' (date) from observing a sequence of passwords displayed on display 18. Within computer 34, even the most readily copyable medium, a diskette, cannot be conveniently employed to decode the seed or the function f' (date). Such is the case because the seed can be embedded in data or code within the diskette at a different location from the logic that is called to effect password generation in response to keyboard input of the current date. Thus a significant degree of security is afforded.

Figure 3:
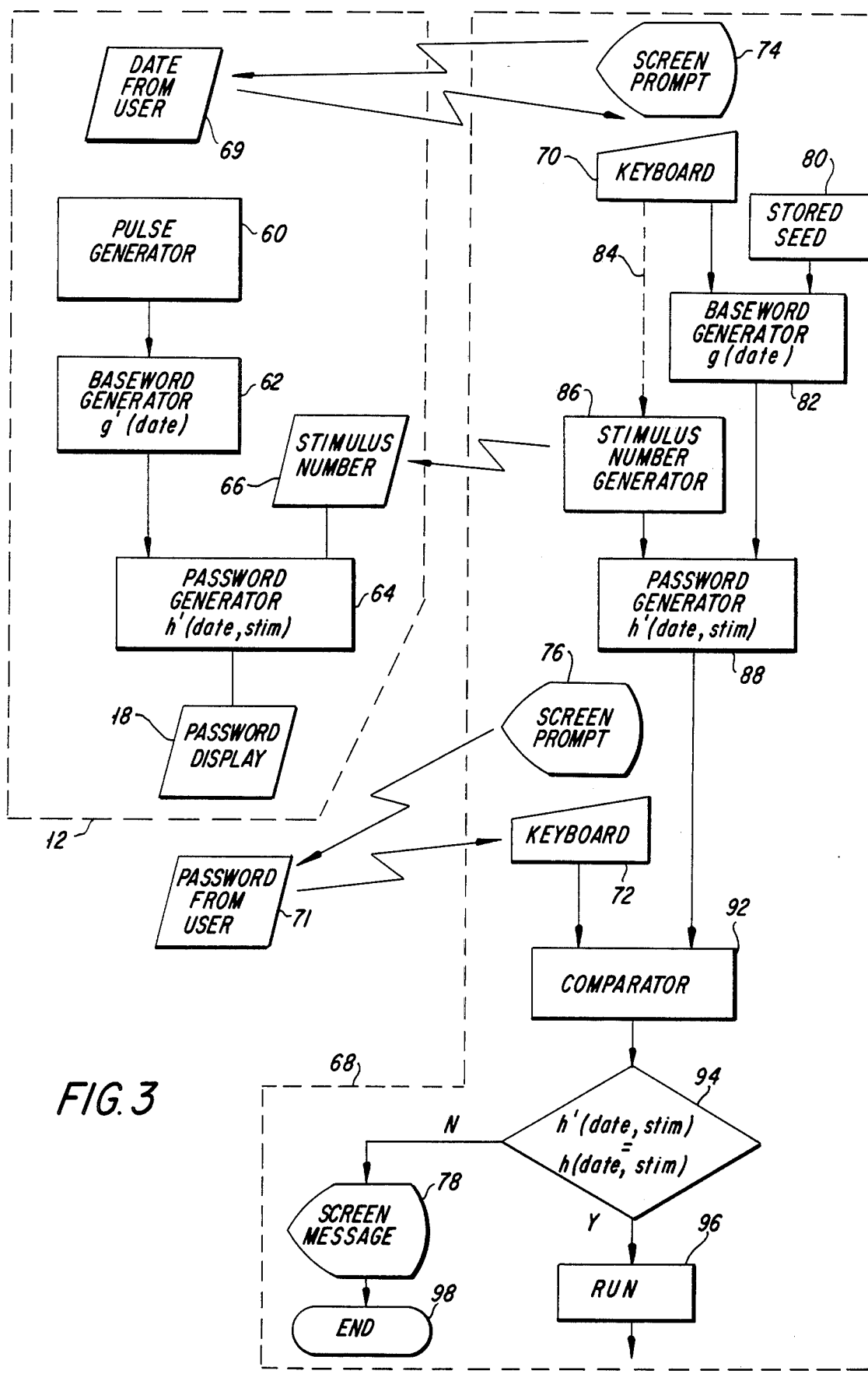
FIG. 3 is a block diagram similar to FIG. 2 but showing an enhanced key according to the invention.
Figure 4:
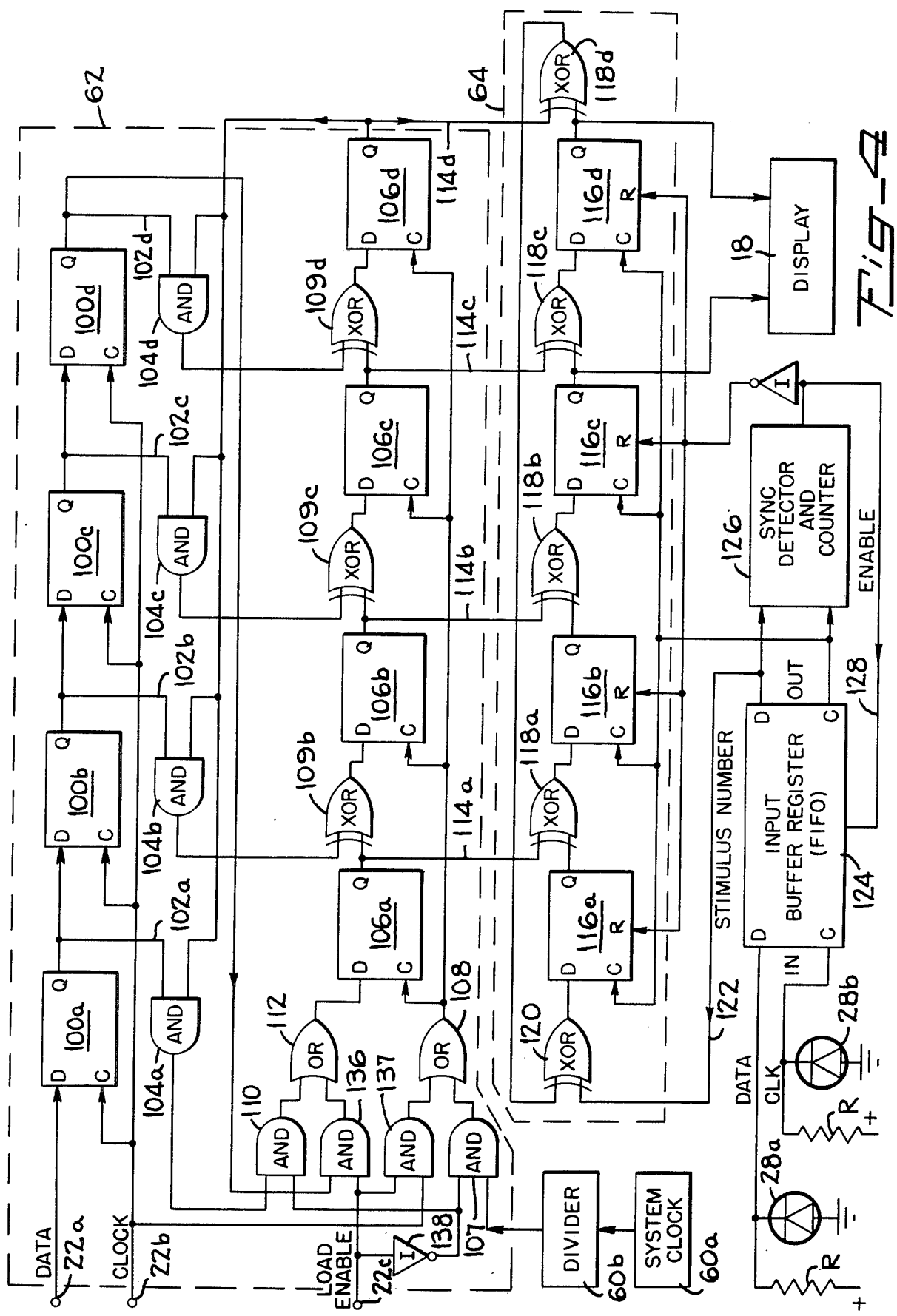
FIG. 4 is a block diagram of exemplary circuitry within the key of FIG. 3.

The embodiment shown in FIGS. 3 and 4 exploits sensors 28a-28d to afford a key having even greater immunity to unauthorized decoding or reverse engineering. Referring to FIG. 3, key 12 includes a pulse generator 60 which is substantially identical to pulse generator 30 described above in connection with FIG. 2 in that pulse generator 60 produces pulses at a rate depending on the elapse of real time, for example one pulse per day. The output of pulse generator 60 is coupled to a baseword generator 62. Baseword generator 62 is similar in many respects to password generator 32 described in connection with FIG. 2. Baseword generator 62 is typically embodied in a shift register having a serial input and plural parallel outputs. Pulses from pulse generator 60 are coupled to the serial input and the combination of the bit states at parallel output forms a number that is a function, g' (date), of elapsed time, i.e., the total number of pulses that have been produced by pulse generator 60 since initialization. Baseword generator 62 is initialized at the time of manufacture with a unique bit pattern; because the baseword generator is typically embodied in a silicon chip, the possible number of unique bit patterns is virtually unlimited. The parallel outputs of baseword generator are coupled as one input to a password generator 64. The other input of password generator 64 is supplied from a stimulus number input 66 via sensors 28a-28d. Password generator 64 produces an output that is a function of both the baseword, in turn a function of the date, and the stimulus number, such function being referred to herein as h' (date, stim), "stim" being an abbreviation for stimulus number. The output of password generator 64 is a plurality of bit states in parallel and selected ones of the bits are made accessible to the user via display 18 to which the password generator output is coupled.

Key 12 is adapted for use with a computer system 68 which is similar to that described above in connection with FIG. 2. Computer 68 also contains software capable of executing an alogorithm somewhat different from that described previously. Computer 68 has a keyboard; the user of the key supplies to the computer from the keyboard the current date as indicated at 69 and 70 and the password as indicated at 71 and 72. Computer 68 also has a display screen D (FIG. 1), such as a video display, for prompting the user, screen prompts being illustrated in FIG. 3 at 74, 76 and 78. The computer or the program loaded thereinto has a stored seed, indicated at 80, which is uniquely associated with the state at which baseword generator is initialized at manufacturing time so that key 12 and the medium in which the stored seed exists are uniquely assocated throughout the useful life of the apparatus. Computer 68 also includes software code so that the computer can function as a baseword generator 82 and produce a baseword that is a function, g(date) of both the date input by the user to keyboard 70 and the stored seed 80. The output of baseword generator 62 in key 12 and the output of baseword generator 82 in computer 68 bear a prescribed relationship to one another, typically equality. There is a control path 84 from keyboard 70 to a stimulus number generator 86 so that when user inputs a date to keyboard 70, stimulus number generator 86 is activated to produce an output which can be a random or arbitrarily varying number. The stimulus number produced by stimulus number generator 86 is utilized in two ways. First the stimulus number is saved as one input to a password generator 88. Second the stimulus number is processed by the computer to produce a time-space pattern on screen sites S for transmission of information that can be sensed by sensors 28a–28d.

The user can place key 12 adjacent the computer display such that sensors 28a–28d are excited by radiation from the screen sites so that a signal representative of the output of stimulus number generator 86 is applied to password generator 64 in the key.

Password generator 88 produces a function h(date, stim) which bears a prescribed relationship to the password produced by password generator 64, equality being the typical relationship. The password displayed on display 18 is input to computer 68, element 71 representing the user's input and element 72 representing reception at the computer keyboard of the password. The password input by the user and the password generated by password generator 88 are compared by the computer which is coded so as to form a comparator 92. There is decision logic 94 within computer 68, and if correspondence between the computer generated password and the user input password is detected, the software program to which access is to be controlled is run as indicated at 96. If, to the contrary, lack of correspondence between the two passwords is detected, a screen message is produced, as indicated at 78, and access to the software program is denied, indicated at 98.

In further explanation of the construction of key 12, reference is made to FIG. 4. In FIG. 4 discrete logical elements are shown solely for the purpose of illustration, because the preferred embodiment of the invention incorporates the circuit functions within one or more silicon chips. In FIG. 4, at the upper portion thereof, are four data type flip-flops 100a, 100b, 100c and 100d. The flip-flops form a shift register having four outputs identified at 102a, 102b, 102c and 102d. The state of the flip-flops 100a–100d, and therefore the bit pattern appearing at outputs 102a–102d, remians constant throughout the life of the key, and after initialization uniquely identifies a single user. Although four flip-flops provide only sixteen combinations of unique nubers or functions it is reiterated that FIG. 4 is for the purpose of illustration and is not for the purpose of limitation.

As will appear, the state of flip-flops 100a–100d defines the function g' referred previously in connection with element 62 of FIG. 3 to which the timing pulses from pulse generator 60 are subjected to produce the baseword g' (data). Parallel outputs 102a–102d are connected as inputs to respective AND gates 104a, 104b, 104c and 104d.

The outputs of AND gates 104a–104d are gated to the inputs of respective data type flip-flops 106a, 106b, 106c and 106d. Flip-flops 106a–106d have clock inputs to which the output of pulse generator 60 is coupled; in FIG. 4 pulse generator 60 is shown as a crystal controlled oscillator that constitutes a system clock 60a which produces system clock pulses at a releatively high rate and a divider corcuit 60b which divides the relatively high frequency pulses produced by the system clock so that the output of the divide circuit provides a pulse at a repitition rate of one per day. Divide circuit 60b is coupled to the clock inputs of flip-flops 106a–106d through an AND gate 107 and an OR gate 108. Each AND gate 104a–104d includes a second input to which is coupled the Q output of flip-flop 106d. The outputs of AND gates 104a–104d thus depend on the state of flip-flop 106d and the states of respective flip-flops 100a–100d. The D inputs of flip-flops 106b–106d are supplied through respective XOR gates 109b, 109c and 109d which have one input coupled to respective AND gates 104b–104d and another input coupled to the output of the preceding flip-flop, namely: 106a–106c, respectively. The input to flip-flop 106a is supplied by AND gate 104a through an AND gate 110 and an OR gate 112. After initialization during manufacture, AND gate 110 is continuously enabled so that during the life of key 12 operation occurs as though AND gate 104a were directly connected to the D input of flip-flop 106a.

Flip-flops 100a–100d together with AND gates 104a–104d and XOR gates 109b–109d cooperate to produce the function g' (date). Thus flip-flops 106a–106d have respective outputs 114a–114d the bit pattern of which corresponds to the baseword, g' (date). As such the bit pattern appearing on outputs 114a–114d changes once each day to a number that is the function of the number of pulses supplied by divider circuit 60b and the state stored in flip-flops 100a–100d.

The baseword is coupled to a password generator 64 which includes data type flip-flops 116a, 116b, 116c and 116d. There are four XOR gates 118a, 118b, 118c and 118d, each of which has one input driven by the respective Q outputs of flip-flops 106a–106d and the other input driven by respective flip-flops 116a–116d. The output of XOR gate 118a is coupled to the D input of flip-flop 116b, the output of XOR gate 118b is coupled to the D input of flip-flop 116c, the output of XOR gate 118c is coupled to the D input of flip-flop 116d and the output of XOR gate 118d is coupled to the D input of flip-flop 116a through an XOR gate 120. To the other input of XOR gate 120 via a circuit path 122 is coupled the stimulus number received by sensors 28a–28d and indicated in FIG. 3 at 66.

Two sensors, such as sensor 28a and 28d are shown in FIG. 4. The other two sensors, 28b and 28c, are omitted for simplicity because their outputs are handled in substantially the same manner as is the output of sensor 28a. The sensors are biased by pull up resistors R which are connected to the positive terminal of the battery power supply within key 12. The outputs of the sensors constitute inputs to an input buffer register 124. Buffer register 124 is a FIFO register. The register has a plurality of data inputs one of which is shown coupled to the output of sensor 28a and a clock input shown coupled to the output of sensor 28b. The buffer register has a Q output, on which data appears, and a clock output. The data and clock outputs of input register 124 are coupled to a sync detector and counter 126. Sync detector 126 is a well known circuit which detects a prescribed pattern and number of signals supplied to it from buffer register 124 to ascertain when a data signal, in contrast to noise or the like, has been applied to the sensors. When ascertainment of data signals is made, sync detector supplies via a circuit path 128 an enable signal to input register 124. In response to receipt of an enable signal, the input register supplies data to XOR gate 120 via circuit path 122. Sync detector and counter 126 includes a counter which counts a prescribed number of pulses (four in the exemplary circuit of FIG. 4) and applies an enable signal on circuit path 128 for a period corresponding to the duration of the prescribed number of pulses. There is an inverter 129 coupled from circuit path 128 to the reset inputs of flip-flops 116a–116d. When there is no enable signal on circuit path 128, the action of inverter is such as to reset flip-flops 116a–116d so that the state of their respective outputs is 0. When a stimulus number of proper format is received, the enable signal is asserted and the reset signal to flip-flops 116a–116d is discontinued so that the stimulus number can be loaded into the shift register constituted by the latter flip-flops.

The bits appearing at the outputs of flip-flops 116c and 116d are displayed to the user on display 18. Because FIG. 4 has been reduced and simplified for the purposes of clarity of description, the output of only two of the flip-flops that constitute a part of password generator 64 are employed. In actual practice, as has been stated previously, more than two bits are employed and more than one digit is displayed on display 18.

Before summarizing the operation of the circuit of FIG. 4, initialization of the circuit will be described. Initialization occurs either at the time of manufacture or at some subsequent time when the key is to be introduced into commerce in combination with a specific computer software program to which access is to be limited. In the embodiment shown in FIG. 4, there are three inputs to which connection is necessary for initialization. Such inputs have been previously identified in connection with FIG. 1 as contact points 22. One initialization input 22a, a data input, is coupled directly to the D input of flip-flop 100a. A second initialization input 22b, a clock input, is coupled to the clock inputs of flip-flops 100a–100d and to the clock inputs of flip-flops 106a–106d through a gating circuit. A third initialization input 22c, a load enable input, is directly coupled to one input of each of two AND gates 136 and 137 and is coupled through an inverter 138 to one input of each of two AND gates 107 and 110. The other input of AND gate 136 is coupled to the Q output of flip-flop 100d. The other input of AND gate 137 is coupled to clock input 22b. The outputs of AND gates 110 and 136 constitute the inputs to OR gate 112. During initialization only AND gates 136 and 137 are active because the load enable signal applied to initialization input 22c and inverted by inverter 138, disables AND gates 107 and 110.

In order to initialize the key, that is, to load into the shift register formed by flip-flops 100a–100d a permanent, unique number, an enable signal is first applied to load enable input 22c. The enable signal is a voltage level that corresponds to a logical 1. A serial bit pattern is then applied to data input 22a and a clock pulse signal, at a rate substantially in excess of that produced by divider circuit 60b, is applied to clock input 22c until flip-flops 100a–100d are loaded with the desired permanent bit pattern and flip-flops 106a–106d are loaded with an initial bit pattern. Thereafter connections to initialization inputs 22a, 22b and 22c are broken and the key is ready for use. Operation of key 12 will be described by using an example in which the bit pattern loaded into flip-flops 100a–100s is 0101, and the bit pattern initially loaded into flip-flops 106a–106d is 1100. Because flip-flops 116a–116d are reset prior to each introduction of a stimulus number, their respective Q outputs are set to a logical 0 state.

The output of password generator 64 is constituted by the outputs of flip-flops 116c and 116d which are coupled to display 18. The outputs of all flip-flops constituting password generator 64 are defined by the following equations:

$$Q_{116a}(t+1) = \text{stim}(t) \, XOR \, (Q_{116d}(t) \, XOR \, Q_{106d})$$

$$Q_{116b}(t+1) = Q_{116a}(t) \, XOR \, Q_{106a}(t)$$

$$Q_{116c}(t+1) = Q_{116b}(t) \, XOR \, Q_{106b}(t)$$

$$Q_{116d}(t+1) = Q_{116c}(t) \, XOR \, Q_{106c}(t)$$

In the above formulas Q(t) represents the state of the indicated parameter before a clock pulse is supplied by buffer register 124 to the flip-flops, the parameter Q(t+1) represents the state after such clock pulse, and the parameter stim represents the value of a bit in the stimulus number by sensors 28a–28d and processed by buffer register 124.

Referring to the table of FIG. 5, rows 140 show a typical number permanently stored in the shift register constituted by flip-flops 100a-100d. Rows 142 show the number stored in the shift register constituted by flip-flops 106a-106d immediately after initialization, i.e., during day 0 in the operating life of the key. Rows 144 show that upon reset, the output of password generator 64, constituted by flip-flops 116a-116d, is constituted by all logical 0s. The next group 146 of four rows shows the outputs of flip-flops 116a-116d as each digit of a stimulus number 1110 is detected by sensors 28a-28d, processed by buffer register 124, and supplied to password generator 64 via circuit path 122. Upon completion of processing of the stimulus number, display 18 displays a number representative of binary 11 and indicated at $18_1$.

Row group 148 shows the processing of a subsequent stimulus number, in this case 0100. The password displayed to the user by display 18 is representative of binary 10, indicated at $18_2$.

When a timing pulse is produced by system clock 60a and divider 60b, the output states of flip-flops 106a-106d are changed, the new states being a function of the prior states of those flip-flops and the number permanently stored in flip-flops 100a-100d. Rows 150 show the state of flip-flops 106a-106d at day 1. If during day 1 the user wishes to use the device and if a stimulus number 1111 is produced by the computer system and received by sensors 28a-28d, indicated at row group 152, display 18 will display a number representative of binary 11, indicated at $18_3$ in FIG. 5.

The sequence of operation described above demonstrates that the password displayed to the user changes on a daily basis and changes for each stimulus number received from the computer system with which the device is used. Because the relation between the number permanently stored in flip-flops 100a-100d and the password characters displayed to the user is not an inverse relation, it is virtually impossible for even the legitimate possessor of the key to deduce the permanently stored number of the function or algorithm that is employed to generate the displayed password characters.

To afford further insight into the apparatus of FIGS. 3 and 4, the following pseudo code is presented to illustrate cooperation of a computer in which resides a program to which access is sought by a user and a key embodying the invention:

(1) Prompt user for date;
(2) Accept date from user;
(3A) Compute internal baseword from date and stored seed;
(3B) Generate stimulus number;
(3C) Transmit stimulus number to user and save stimulus number;
(3D) Compute internal password from internal baseword and saved stimulus number;
(4) Prompt user for password;
(5) Accept password from user;
(6) Compare user password and internal password;
(7) Initiate program execution if equal.

In the embodiment of the invention described in more detail in connection with FIG. 2, the steps identified above as 3A-3D are combined and simplified to produce apparatus that affords security against unauthorized access to a somewhat lesser degree than the embodiment of the invention shown in FIGS. 3 and 4.

Figure 6:
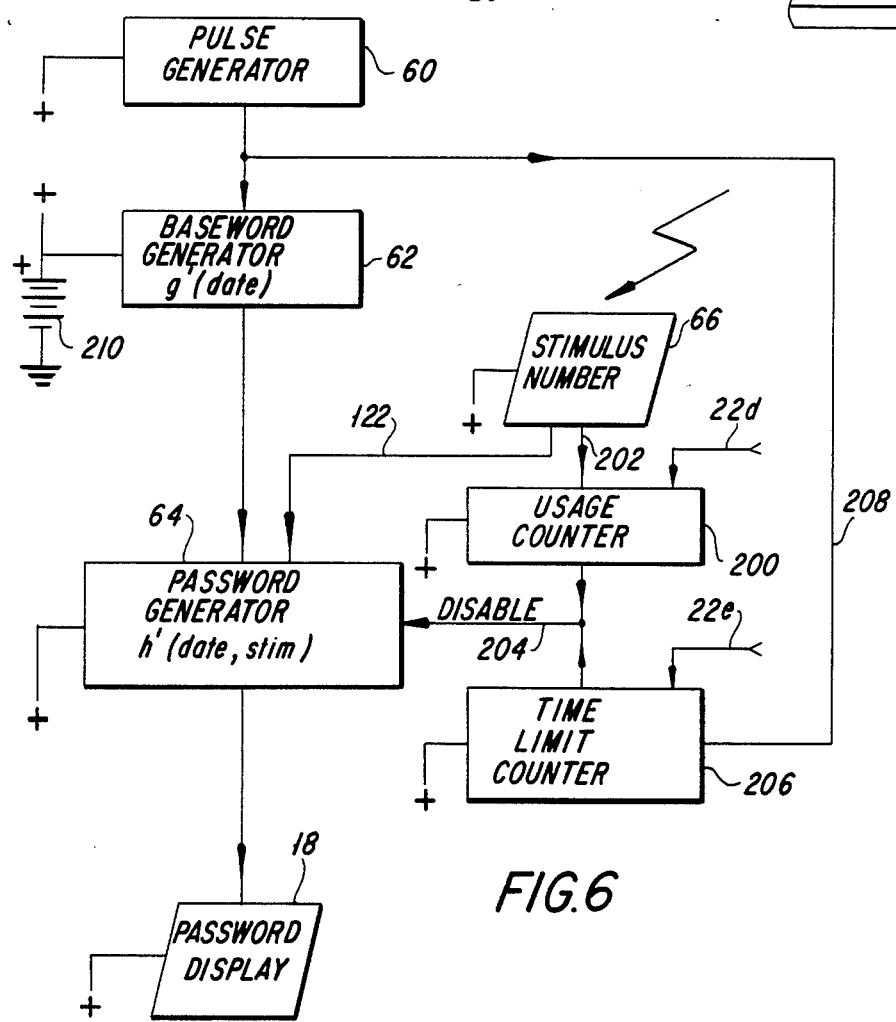
FIG. 6 is a block diagram of a key showing various enhancements in accordance with the invention.

The elements in FIG. 6 that are identical to similar elements in FIG. 3 bear identical reference numerals to those employed in FIG. 3. There is a pulse generator 60 which produces an output each day or like constant time interval. The timing pulse is coupled to baseword generator 62 where it is used as previously described. The baseword generated by baseword generator 62 is coupled to a password generator 64. Also coupled to password generator 64 is a stimulus number input from the video display via sensors 28a-28d, reception and processing of the stimulus number being indicated at 66. Password generator 64 produces a password that is displayed to the user on display 18 and the user inputs the password to the computer to obtain access to the protected software within the computer.

There are certain instances where the owner of software may desire to limit the usage made of the software. One form of limited usage is to permit the software user to access the software a specific number of times. To afford this mode of operation one enhancement in the device shown in FIG. 6 is a usage counter 200. The usage counter is typically loaded at initialization time with a number equal to the authorized number of uses of the software. Each time a stimulus number is received and processed, as at 66, a pulse is applied to the usage counter via a signal path 202 to decrement the counter. When the counter is ultimately decremented to 0 the counter produces a disable signal on a signal path 204. The disable signal is coupled to password generator 64, and when the disable signal occurs, password generator 64 is disabled. Usage counter has an initialization input 22d so that at the time of initialization, the number of times for authorized usage can be loaded into the counter. Input 22d is accessible from a contact point 22 (FIG. 1).

Another technique for limiting the usage of the software program is to place a time limit on the usage rather than a usage limit. For this purpose there is a time limit counter 206 which is loaded to some initial count indicating the number of days of authorized usage, there being an initialization input 22e for this purpose. A timing pulse from pulse generator 60 is supplied via a signal path 208 to time limit counter 206 each time a pulse is produced by pulse generator 60, e.g. one pulse per day. The count stored in time limit counter reaches 0, a disable signal is produced on signal path 204 which disables password generator 64 and prevents further access to the program.

In the interest of completeness a power supply in the form of a battery 210 is shown in FIG. 6. Such battery is also provided for the key shown in the other figures but it is not shown in the other figures in the interests of simplicity and clarity. Suffice it to say the battery is connected to each of the elements within the circuit, the connections being indicated by an input lead having a plus sign, "+", adjacent the distal end thereof.

Thus it will be seen that the present invention provides a device that affords security against unauthorized access to computer software programs. Because the date represented by the cumulative number of pulses produced since initialization and the stimulus number are each modified according to one or more functions in producing a password visible to the user and because each function is not palpable, ascertainment of the password by reverse engineering or like analysis is so difficult as to be virtually impossible. The device is highly portable, convenient to use and relatively inexpensive to produce. In addition use of the device is convenient because no connection to or modification of the computer system is required.

Although several embodiments of the invention have been shown and described, it will be obvious that other adaptations and modifications can be made without departing from the true spirit and scope of the invention.

What is claimed is:

1. Apparatus for affording access by a user to a software program residing in a computer, comprising an access key capable of generating a password and of being transported independently of the computer and an access key verification means adapted to be resident in the computer, for verifying a password generated by the access key and allowing access and use to the software program wherein:

said access key includes:
 (a) pulse generating means for generating a signal that is dependent in the elapse of time;
 (b) password generating means coupled to said pulse generating means for generating a password from the signal from said pulse generating means;
 (c) displaying means communicating with the password generating means for displaying at least part of said password; and said access key verification means includes:
 (a) means for receiving at least initially a time input;
 (b) means for receiving the password as generated by the access key and input by the user;
 (c) means for processing the time input for producing an internal password;
 (d) means for determining if the internal password bears a prescribed relationship to the password generated by said access key;
 (e) means for affording access to the software program if the prescribed relationship exists.

2. The apparatus of claim 1 wherein:
said pulse generating means includes means for generating in accordance with a prescribed algorithm a password comprised of a character string; and
said displaying means includes means for displaying at least one character representative of said character string.

3. Apparatus in accordance with claim 1, wherein the computer has a video display, which can display another signal from the access key verification means, and wherein:

said access key verification means further includes:
 (a) a stimulus number generating means for generating a stimulus number;
 (b) means for generating another signal on the video display that is representative of said stimulus number; and said access key further includes:
 (a) at least one sensor accessible from the exterior of said access key so that juxtaposition of the access key and the display affords excitation of the sensor by the another signal;
 (b) means coupled to said sensor for decoding the another signal to produce the stimulus number;
 (c) said password generating means including a baseword generating means communicating with said pulse generating means for producing a baseword that is a function of the signal produced by said pulse generating means;
 (d) said password generating means including a means for combining the stimulus number with the baseword to produce the password.

4. Apparatus in accordance with claim 3 wherein said access key includes:
means for counting each time said sensor is excited by the another signal on the video display; and
means for disabling said access key when the count on the counting means reaches a predetermined count.

5. Apparatus in accordance with claim 1, wherein the computer has a display, which can display another signal from the access key verification means, and wherein:

said access key verification means further includes:
 (a) a stimulus number generating means for generating a stimulus number;
 (b) means for generating another signal on the computer display that is representative of said stimulus number; and said access key further includes:
 (a) means for entering and decoding the another signal to produce the stimulus number;
 (b) said password generating means including a baseword generating means communicating with said pulse generating means for producing a baseword that is a function of the signal produced by said pulse generating means;
 (c) said password generating means including a means for combining the stimulus number with the baseword to produce the password.

6. Apparatus in accordance with claim 1 wherein said access key includes:
said signal from the pulse generating means providing a series of pulses;
a time limit counter means for counting pulses;
means for coupling said time limit counter means to said pulse generating means to count the number of pulses generated thereby; and
means for disabling said key when said time limit counter has counted a predetermined number of pulses from said pulse generating apparatus.

7. Apparatus according to claim 1,
wherein said password generating means of said access key comprises:
 (a) a first registor initialized to a fixed state that uniquely identifies the access key;
 (b) a second register for selectively retaining the signal from the pulse generating means;
 (c) means for coupling said pulse generating means to said second register;

(d) means for gating outputs of said first and second registers to produce said password; and said access key verification means includes:
(a) means for being initialized to a fixed state uniquely associated with the fixed state of said first register of said access key.

8. Apparatus according to claim 7 with the computer having a video display which can display another signal from the access key verification means, wherein:

said access key verification means includes:
(a) means for generating a stimulus number;
(b) means for generating another signal on the video display that is representative of said stimulus number;

said access key includes:
(a) at least one sensor accessible from the exterior of said access key so that juxtaposition of the access key and the display affords excitation of the sensor by the another signal;
(b) a third register for selectively retaining the another signal on the video display;
(c) means for communicating the sensor to said third register so that the another signal can alter the state of the third register in accordance with the stimulus number; and
(d) said gating means includes means for gating an output from said third register with the output from said first and second registers to produce said password.

9. Apparatus according to claim 7 wherein said access key includes:
a plurality of contacts means accessible from the exterior of said access key for initializing said access key;
means for coupling one of said contacts to said first register and another of said contacts to said second register; and
means for rendering the contacts immune to reinitialization.

10. Apparatus according to claim 9 wherein said rendering means includes means for insulating said contacts after initialization.

11. Apparatus in accordance with claim 9 wherein said access key includes:
a third contact;
means for communicating said third contact with said gating means;
wherein said gating means includes means for enabling said first and second registers responsive to an initialization signal being applied to said third contact.

12. Apparatus in accordance with claim 1, wherein the computer has a video display which can display another signal from the access key verification means, wherein:

said access key verification means includes:
(a) a stimulus number generating means for generating a stimulus number;
(b) means for generating another signal on the video display that is representative of said stimulus number; and said access key includes:
(a) at least one sensor accessible from the exterior of said access key so that juxtaposition of the access key and the display affords excitation of the sensor by the another signal;
(b) means coupled to said sensor for decoding the another signal to produce the stimulus number;
(c) said password generating means including a means for combining the stimulus number with the signal from the pulse generator to produce the password.

13. Apparatus in accordance with claim 1, wherein the computer has a video display which can display another signal from the access key verification means, and wherein:

said access key verification means includes:
(a) a stimulus number generating means for generating a stimulus number;
(b) means for generating another signal on the computer display that is representative of said stimulus number; and said access key includes:
(a) means for entering and decoding the another signal to produce the stimulus number;
(b) said password generating means including a means for combining the stimulus number with the signal from the pulse generator to produce the password.

14. Apparatus for affording access by a user to a software program residing in a computer, comprising an access key capable of generating a password and of being transported independently of the computer, and an access key verification means adapted to be resident in the computer, for verifying a password generated by the access key and allowing access and use of the software program wherein:

said access key includes:
(a) pulse generating means for generating a signal that is dependent on the elapse of time;
(b) password generating means coupled to said pulse generating means for encrypting the signal from said pulse generating means into a password;
(c) displaying means communicating with the password generating means for displaying at least part of said password; and said access key verification means includes:
(a) means for receiving at least initially a time input;
(b) means for receiving the password as generated by the access key and input by the user;
(c) means for decrypting the password for producing a decrypted password;
(d) means for determining if the decrypted password bears a prescribed relationship to the time input;
(e) means for affording access to the software program if the prescribed relationship exists.

15. Apparatus in accordance with claim 14, wherein the computer has a video display which can display another signal from the access key verification means, and wherein:

said access key verification means includes:
(a) a stimulus number generating means for generating a stimulus number;
(b) means for generating another signal on the video display that is representative of said stimulus number; and said access key includes:
(a) at least one sensor accessible from the exterior of said access key so that juxtaposition of the access key and the display affords excitation of the sensor by the another signal;
(b) means coupled to said sensor for decoding the another signal to produce the stimulus number;
(c) said password generating means including a means for encrypting the stimulus number with the signal from the pulse generating means to produce the password.

16. The apparatus of claim 15 including:
means for counting each time said sensor is excited by the video display of the computer;
means for disabling the access key when the counter reaches a predetermined count.

17. Apparatus in accordance with claim 14, wherein the computer has a display which can display another signal from the access key verification means, and wherein:
said access key verification means includes:
(a) a stimulus number generating means for generating a stimulus number;
(b) means for generating another signal on the computer display that is representative of said stimulus number; and
said access key includes:
(a) means for entering and decoding the another signal to produce the stimulus number;
(b) said password generating means including a means for encrypting the stimulus number with the signal from the pulse generating means to produce the password.

18. Apparatus for affording access by a user to a software program residing in a computer with a video display comprising access key verification means adapted to be resident in the computer, for verifying an encrypted password and allowing access and use of the software program, and an access key capable of generating an ecrypted password and of being transported independently of the computer, wherein:
said access key verification means includes:
(a) means for receiving at least initially a time input;
(b) a stimulus number generating means for generating a stimulus number;
(c) means for generating a signal on the video display that is representative of said stimulus number; and
said access key includes:
(a) pulse generating means for generating another signal that is dependent on the elapse of time;
(b) at least one sensor accessible from the exterior of said access key so that juxtaposition of the access key and the video display affords excitation of the sensor by the signal;
(c) means coupled to said sensor for decoding the signal to produce the stimulus number;
(d) password generating means for encrypting said another signal produced by said pulse generating means and said stimulus number for producing an encrypted password;
(e) displaying means communicating with the password generating means for displaying at least part of said encrypted password, so that the user can input the encrypted password into the computer;
wherein said access key verification means further includes:
(a) means for decrypting the encrypted password displayed on the access key;
(b) means for determining if the decrypted password has a prescribed relationship to at least one of the stimulus number and the input time;
(c) means for affording access to the software program if the prescribed relationship exists.

19. The access key of claim 18 including:
means for counting each time said sensor is excited by the video display of the computer;
means for disabling the access key when the counter reaches a predetermined count.

20. Apparatus for affording access by a user to a software program residing in a computer with a display comprising access key verification means adapted to be resident in the computer, for verifying an encrypted password and allowing access and use of the software program, and an access key capable of generating an encrypted password and of being transported independently of the computer, wherein:
said access key verification means includes:
(a) means for receiving at least initially a time input;
(b) a stimulus number generating means for generating a stimulus number;
(c) means for generating a signal on the computer display that is representative of said stimulus number; and
said access key includes:
(a) pulse generating means for generating another signal that is dependent on the elapse of time;
(b) means for entering and decoding the signal to produce the stimulus number;
(c) password generating means for encrypting said another signal produced by said pulse generating means and said stimulus number for producing an encrypted password;
(d) displaying means communicating with the password generating means for displaying at least part of said encrypted password, so that the user can input the encrypted password into the computer;
wherein said access key verification means further includes:
(a) means for decrypting the encrypted password displayed on the access key;
(b) means for determining if the decrypted password has a prescribed relationship to at least one of the stimulus number and the input time;
(c) means for affording access to the software program if the prescribed relationship exists.

* * * * *

UNITED STATES PATENT AND TRADEMARK OFFICE
CERTIFICATE OF CORRECTION

PATENT NO. : 4,599,489

DATED : July 8, 1986

INVENTOR(S) : William P. Cargile

It is certified that error appears in the above-identified patent and that said Letters Patent is hereby corrected as shown below:

In column 3, line 10, "is that is" should be --is that it--.

In column 7, line 39, "to" should be inserted after "adjacent".

In Claim 7, (a), "registor" should be --register--.

Signed and Sealed this

Second Day of December, 1986

*Attest:*

DONALD J. QUIGG

*Attesting Officer*  *Commissioner of Patents and Trademarks*